US008611963B2

(12) United States Patent
Lee

(10) Patent No.: US 8,611,963 B2
(45) Date of Patent: Dec. 17, 2013

(54) MOBILE TERMINAL PROCESSING AND TRANSMITTING INFORMATION RELATED TO DATA PLAY AND PLAYING DATA ACCORDING TO INFORMATION

(75) Inventor: Eun Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 909 days.

(21) Appl. No.: 12/256,678

(22) Filed: Oct. 23, 2008

(65) Prior Publication Data

US 2009/0111374 A1    Apr. 30, 2009

(30) Foreign Application Priority Data

Oct. 30, 2007  (KR) .................. 10-2007-0109826

(51) Int. Cl.
*H04B 1/38* (2006.01)
(52) U.S. Cl.
USPC .................. 455/566; 455/550.1; 715/748
(58) Field of Classification Search
USPC ............ 455/575.1–575.4, 566, 179.1, 185, 1, 455/186.1, 412.1, 414.3, 415, 422.1, 436, 455/456.5, 557, 512, 550.1, 553.1, 556.1; 725/723, 205, 143, 146, 37, 47, 51; 370/254, 252, 260, 312, 324, 347, 352, 370/356, 384, 386, 392, 259, 466, 401; 375/216, 240.26, 295, 354
See application file for complete search history.

(56) References Cited

U.S. PATENT DOCUMENTS

| 5,440,678 | A | 8/1995 | Eisen et al. | |
| 6,230,172 | B1 | 5/2001 | Purnaveja et al. | |
| 2004/0001220 | A1* | 1/2004 | Gorday et al. | 358/1.15 |
| 2004/0123231 | A1 | 6/2004 | Adams et al. | |
| 2006/0161838 | A1 | 7/2006 | Nydam et al. | |
| 2007/0085759 | A1* | 4/2007 | Lee et al. | 345/1.1 |
| 2007/0245243 | A1* | 10/2007 | Lanza et al. | 715/723 |

FOREIGN PATENT DOCUMENTS

| CN | 1736116 | 2/2006 |
| CN | 1787630 | 6/2006 |
| CN | 1893639 | 1/2007 |
| EP | 1746598 | 7/2006 |
| JP | 2002073049 | 3/2002 |
| JP | 2002132131 | 5/2002 |
| JP | 2006155384 | 6/2006 |
| KR | 10-2005-0071822 | 7/2005 |
| KR | 10-2007-0011811 | 1/2007 |
| WO | 0161448 | 8/2001 |

OTHER PUBLICATIONS

European Patent Office Application Serial No. 08167838.5, Search Report dated Feb. 15, 2013, 9 pages.

* cited by examiner

*Primary Examiner* — Edward Urban
*Assistant Examiner* — Golam Sorowar
(74) *Attorney, Agent, or Firm* — Lee, Hong, Degerman, Kang & Waimey

(57) ABSTRACT

A mobile terminal includes a controller configured to process information related to a play of data on the mobile terminal at a specific time point of the played data, wherein the controller recognizes the specific time point and generates a control signal for enabling data play from the specific time point, and a wireless communication unit transmitting the control signal and the information. In the mobile terminal, the wireless communication unit receives the information related to the play of the data and the control signal for enabling the data play from the specific time point, and the controller facilitates the play of the data according to the received control signal and the information.

12 Claims, 12 Drawing Sheets

MOBILE TERMINAL PROCESSING AND TRANSMITTING INFORMATION RELATED TO DATA PLAY AND PLAYING DATA ACCORDING TO INFORMATION

CROSS-REFERENCE TO RELATED APPLICATION

This application claims the benefit of the Korean Patent Application No. 10-2007-0109826, filed on Oct. 30, 2007, the disclosure of which is incorporated herein by reference.

FIELD OF THE INVENTION

The present invention relates to a mobile terminal processing and transmitting information related to a play of data on the mobile terminal at a specific time point of the played data. The present invention further relates to a mobile terminal playing the data from the specific time point of the played data.

DESCRIPTION OF THE RELATED ART

A mobile terminal may be configured to perform various functions, such as data and voice communications, capturing images and video via a camera, recording audio, playing music files via a speaker system, and displaying images and video on a display. The mobile terminal may also support game play and multimedia play.

More recently, some mobile terminals have been configured to receive broadcast and multicast signals, allowing viewing of videos and television programs. Further, various techniques for sharing multimedia data using a mobile terminal are being developed.

SUMMARY OF THE INVENTION

According to an embodiment of the present invention, a mobile terminal includes a controller configured to process information related to a play of data on the mobile terminal at a specific time point of the played data, wherein the controller recognizes the specific time point and generates a control signal for enabling data play from the specific time point, and a wireless communication unit transmitting the control signal and the information. The mobile terminal may also include a memory storing the data, wherein the controller transmits the data with the control signal and the information via the wireless communication unit. In an aspect of the present invention, the control signal, the information and the data are transmitted using at least one of E-mail, a multimedia message service (MMS), a short message service (SMS), an instant message (IM) service, and short-range communication.

In one aspect of the present invention, the control signal enables data play from one of a plurality of specific time points of the data if the plurality of specific time points exist for the data. The information relates to a specific time period of the data and the control signal enables data play according to the specific time period. The information includes at least one of a user comment related to the data and time information related to the specific time point.

in another aspect of the present invention, the mobile terminal further includes an input unit for receiving the user comment from the user. The user comment is selected from a plurality of comments stored in the mobile terminal.

In yet another aspect of the present invention, the data is stored on a website and the controller transmits with the control signal and the information via the wireless communication unit, peripheral information related to the data stored on the website. The peripheral information includes URL information of the website and the control signal enables data play from a specific time point of the data stored on the website.

According to an embodiment of the present invention, a mobile terminal includes a wireless communication unit for receiving information related to a play of data on the mobile terminal at a specific time point of the played data and receiving a control signal for enabling data play from the specific time point and a controller for facilitating play of the data according to the control signal and the received information. The mobile terminal may further include an input unit for receiving instructions to play the data at the specific time point. The data is received with the information and the control signal via the wireless communication unit.

In one aspect of the present invention, the mobile terminal further includes a memory for storing the received data and the information. The control signal enables data play for one of a plurality of specific time points of the data if the plurality of specific time points is received for the data. The data may be stored on a website and the controller may receive with the control signal and the information via the wireless communication unit, peripheral information related to the data stored on the website.

The controller facilitates play of the data stored on the website using a streaming format by accessing the website using the URL information and the received information related to the specific time point of the data. Further, the controller transmits the received information, the control signal and the data via the wireless communication unit. Furthermore, the controller alters at least one of the stored information, the control signal and the data prior to transmitting via the wireless communication unit.

According to an embodiment of the present invention, a method for transmitting information in a mobile terminal includes processing information related to a play of data on the mobile terminal at a specific time point of the played data, recognizing the specific time point, generating a control signal for enabling data play from the specific time point, and transmitting the control signal and the information.

According to another embodiment of the present invention, a method for receiving information in a mobile terminal includes receiving information related to a play of data on the mobile terminal at a specific time point of the played data, receiving a control signal for enabling data play from the specific time point, and facilitating play of the data according to the control signal and the received information.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
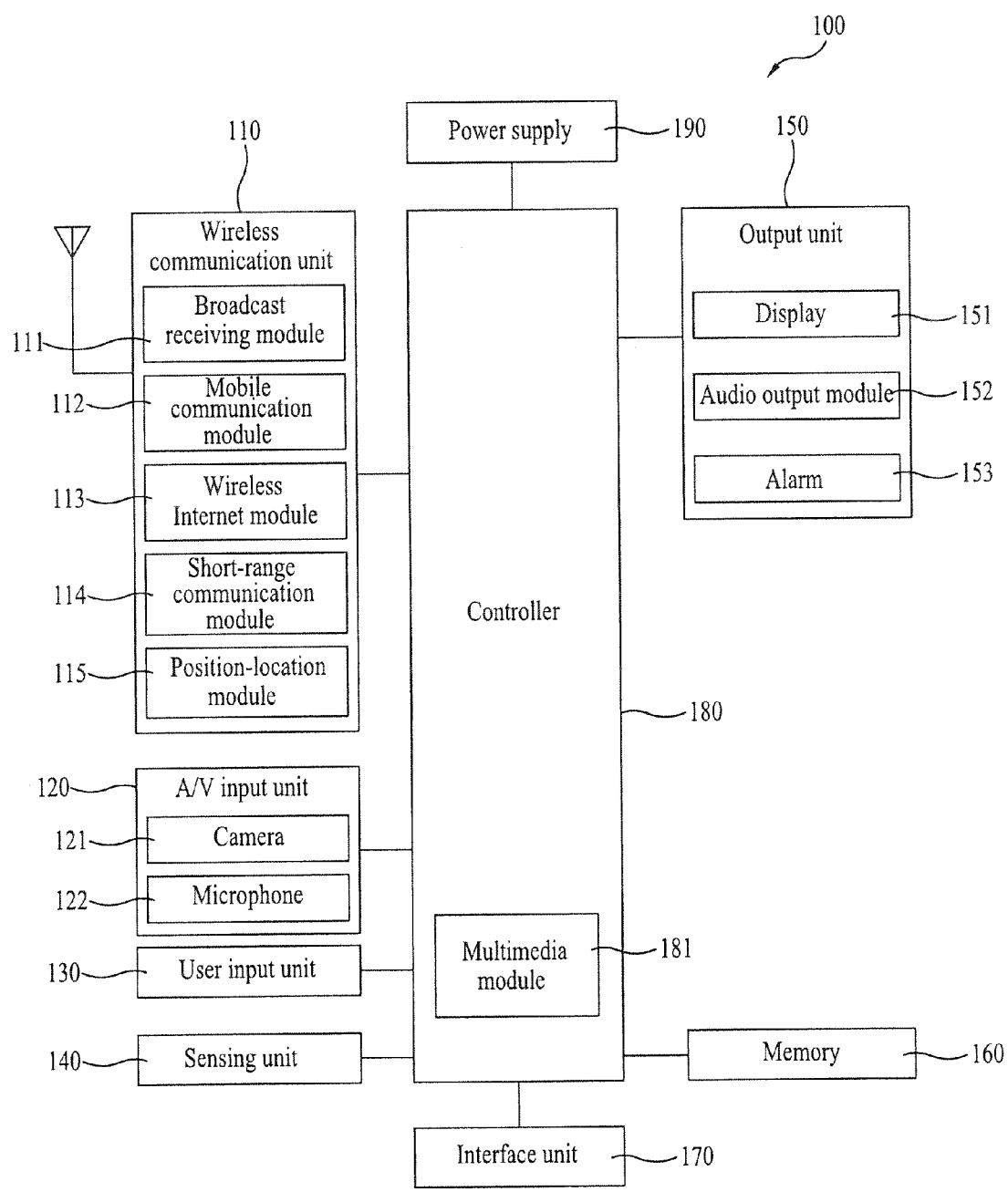
FIG. 1 is a block diagram of a mobile terminal according to an embodiment of the present invention.

FIG. 1 is a block diagram of a mobile terminal 100 according to an embodiment of the present invention. The mobile terminal 100 may be implemented as a variety of different types, such as mobile phones, user equipment, smart phones, computers, digital broadcast terminals, personal digital assistants, portable multimedia players (PMP) and navigators. Although FIG. 1 shows the mobile terminal 100 having various components, not all of the illustrated components may be required and more or less number of components may be implemented in the mobile terminal.

Referring to FIG. 1, a wireless communication unit 110 is configured with several commonly implemented components. For example, the wireless communication unit 110 includes one or more components which permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel includes a satellite channel and a terrestrial channel. The broadcast managing entity refers generally to a system which transmits a broadcast signal and/or broadcast associated information. Examples of the broadcast associated information include information associated with a broadcast channel, a broadcast program, and a broadcast service provider. Specifically, the broadcast associated information includes an electronic program guide (EPG) of digital multimedia broadcasting (DMB) and electronic service guide (ESG) of digital video broadcast-handheld (DVB-H).

The broadcast signal may be implemented as various types of signals including a TV broadcast signal, a radio broadcast signal, and a data broadcast signal. If desired, the broadcast signal may further include a broadcast signal combined with a TV or radio broadcast signal. The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as memory 160.

The mobile communication module 112 transmits/receives wireless signals to/from one or more network entities, such as base station and Node-B. Such signals may represent audio, video, multimedia, control signaling, and data, among others.

The wireless internet module 113 supports Internet access for the mobile terminal 100. This module may be internally or externally coupled to the mobile terminal 100.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as BLUETOOTH and ZIGBEE.

Position-location module 115 identifies or obtains the location of the mobile terminal 100. If desired, this module may be implemented using global positioning system (GPS) components which cooperate with associated satellites, network components, or combinations thereof.

Audio/video (A/V) input unit 120 provides audio or video signal input to the mobile terminal 100. The A/V input unit 120 includes a camera 121 and a microphone 122. The camera 121 receives and processes image frames of still pictures or video. The microphone 122 receives an external audio signal while the mobile terminal 100 is in a particular mode, such as a phone call mode, a recording mode or a voice recognition mode. The audio signal is processed and converted into digital data.

The A/V input unit 120 typically includes assorted noise removing algorithms to remove noise generated in the course of receiving the external audio signal. Data generated by the A/V input unit 120 may be stored in the memory 160, utilized by an output unit 150, or transmitted via one or more modules of the wireless communication unit 110. If desired, two or more microphones and/or cameras may be used.

The user input unit 130 generates input data responsive to user manipulation of an associated input device or devices, such as a keypad, a dome switch, a jog wheel, a jog switch, and a touchpad, for example, static pressure/capacitance. In particular, the user input unit 130 may be configured as a touchpad in cooperation with a touchscreen display.

The sensing unit 140 provides status information for various aspects of the mobile terminal 100. The sensing unit 140 may detect an open/close status of the mobile terminal 100, relative positioning of components, such as a display and keypad, a change in position of the mobile terminal or a component of the mobile terminal, a presence or absence of user contact with the mobile terminal, orientation or acceleration/deceleration of the mobile terminal. For example, in a slide-type mobile terminal, the sensing unit 140 senses whether a sliding portion of the mobile terminal is open or closed. In other examples, the sensing unit 140 senses the presence or absence of power provided by the power supply 190 and the presence or absence of a connection between the interface unit 170 and an external device.

The interface unit 170 is often implemented to couple the mobile terminal 100 with external devices. Typical external devices include wired/wireless headphones, external chargers, power supplies, earphones, microphones, and storage devices configured to store data, such as audio, video, and pictures. The interface unit 170 may be configured using a wired/wireless data port, audio input/output ports, video input/output ports, and a card socket for coupling to a memory card, subscriber identity module (SIM) card, user identity module (UIM) card, and removable user identity module (RUIM) card.

The output unit 150 generally includes various components that support the output requirements of the mobile terminal 100. Display 151 is typically implemented to visually display information associated with the mobile terminal 100. For example, if the mobile terminal 100 is operated in a phone call mode, the display 151 provides a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

In one aspect of the present invention, the display 151 is configured as a touch screen working in cooperation with an input device, such as a touchpad. In this configuration, the display 151 functions as both an output device and an input device.

The display 151 may be implemented using known display technologies, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays. For example, in a two-display embodiment, a first display is configured as an internal display which is viewable when the mobile terminal 100 is in an open position and a second display is configured as an external display which is viewable in both the open and closed positions.

FIG. 1 further shows the output unit 150 having an audio output module 152 which supports the audio output requirements of the mobile terminal 100. The audio output module 152 is often implemented using one or more speakers, buzzers, other audio producing devices, or combinations thereof. The audio output module 152 functions in various modes including a call-receiving mode, a call-placing mode, a recording mode, a voice recognition mode and a broadcast reception mode. During operation, the audio output module 152 outputs audio related to a particular function to notify a received call or message and errors.

The output unit 150 also includes an alarm 153, which is used to signal or identify a particular event associated with the mobile terminal 100. Typical events include receiving a call, a message or a user input. An example of the output includes providing tactile sensations to a user. For example, the alarm 153 may be configured to vibrate when a call or message is received. As another example, vibration is provided by the alarm 153 when a user input is received, thus providing a tactile feedback mechanism. The various output provided by the components of the output unit 150 may be separately performed or performed by using any combination of such components.

The memory 160 is used to store various types of data to support processing, control, and storage requirements of the mobile terminal 100. Examples of such data include program instructions for applications operating on the mobile terminal 100, contact data, phonebook data, messages, pictures, and video. The memory 160 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal 100. For example, the controller 180 controls and processes operations for voice calls, data communications, video calls, camera and recording. The controller 180 may additionally include a multimedia module 181 which provides multimedia play function. The multimedia module 181 may be configured as part of the controller 180 as shown in FIG. 1, or this module may be implemented as a separate component.

The power supply 190 provides power required by the various components of the mobile terminal 100. The provided power may be internal power, external power, or combinations thereof.

Various embodiments described herein may be implemented in a computer-readable medium using, for example, computer software, hardware, or combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments described herein may be implemented with separate software modules such that each of the software modules performs one or more of the functions and operations described herein. The software codes can be implemented with a software application written in any suitable programming language and may be stored in the memory 160, and executed by the controller 180 or a processor.

The mobile terminal 100 may be implemented in a variety of configurations including a folder-type, a slide-type, a bar-type, a rotational-type, a swing-type and combinations thereof. Although a slide-type mobile terminal is described in the application, the same or similar embodiments will apply to other types of mobile terminals as well.

Figure 2:
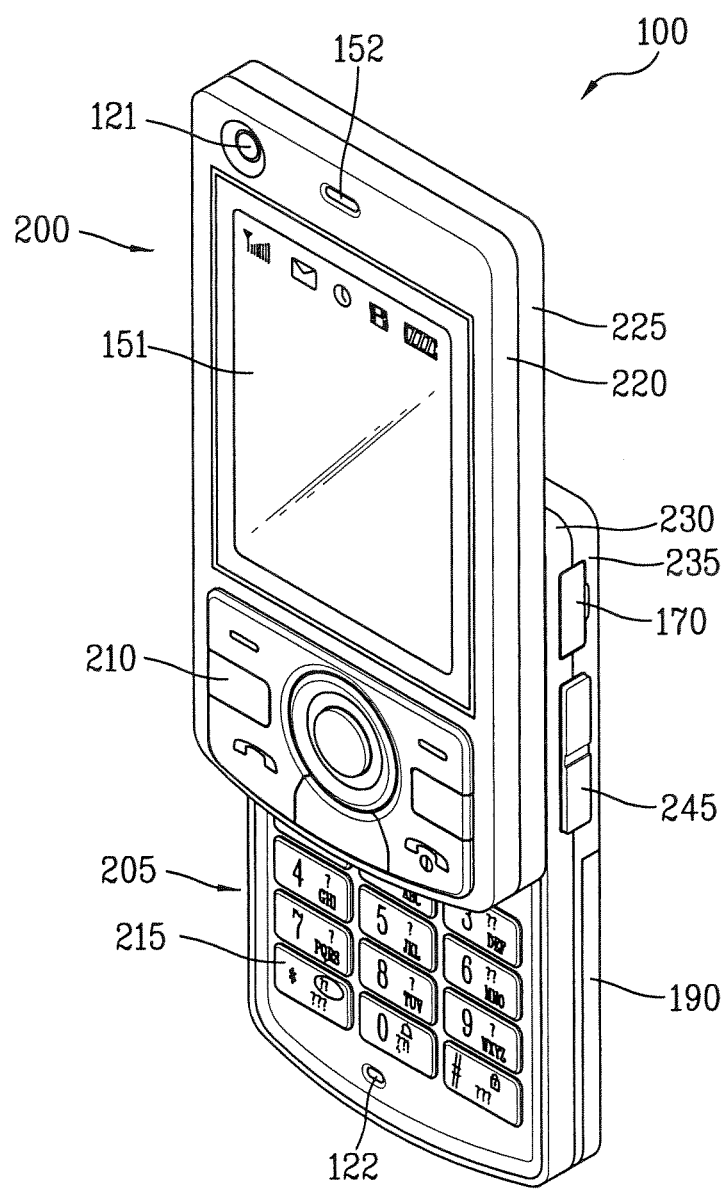
FIG. 2 is a perspective view of a front side of a mobile terminal according to an embodiment of the present invention.

Referring to FIG. 2, the mobile terminal 100 includes a first body 200 slidably coupled with a second body 205. The user input unit 130 is implemented as function keys 210 and keypads 215. The function keys 210 are associated with the first body 200 and the keypads 215 are associated with the second body 205. The keypads 215 include various keys including numbers, characters, and symbols such that a user places a call, composes a text or multimedia message, and operates the mobile terminal 100 via the keypads.

The first body 200 slides relative to the second body 205 such that the mobile terminal 100 is in an open or closed position. In the closed position, the first body 200 is positioned over the second body 205 such that the keypads 215 are substantially or completely covered by the first body 200. In the open position, the user can access the keypads 215, as well as the display 151 and the function keys 210. The function keys 210 are used for entering commands such as start, stop and scroll.

The mobile terminal 100 is operable in either a standby mode to receive a call or message, receive and respond to network control signaling, or in an active call mode. Typically, the mobile terminal 100 is in the standby mode while in the closed position and in the active mode while in the open position. The mode configuration may be changed as required or desired.

The first body 200 includes a first case 220 and a second case 225, and the second body 205 includes its own first case 230 and second case 235. The first and second cases 220, 225, 230, 235 of the first and second bodies 200, 205 are usually formed of a rigid material such as injection molded plastic, or a metallic material such as stainless steel (STS) and titanium (Ti).

If desired, one or more intermediate cases may be provided between the first cases 220, 230 and second cases 225, 235 of one or both of the first and second bodies 200, 205. The first and second bodies 200, 205 are typically sized to receive electronic components necessary to support operation of the mobile terminal 100.

The first body 200 includes a camera 121 and an audio output unit 152, which is configured as a speaker and positioned close to the display 151. The camera 121 may be constructed such that the position can be adjusted, for example, rotated or swiveled relative to first body 200.

The function keys 210 are positioned adjacent to a lower side of the display 151. The display 151 may be implemented as an LCD or OLED. The display 151 may also be configured as a touchscreen having an underlying touchpad which generates signals in response to the user contact, for example via a finger or stylus, with the touchscreen.

Second body 205 includes a microphone 122 positioned adjacent to the keypads 215 and side keys 245, which is one type of the user input unit 130 and positioned along the side of second body. In one aspect of the present invention, the side keys 245 may be configured as hot keys such that the side keys are associated with a particular function of the mobile terminal 100. The interface unit 170 is positioned adjacent to the side keys 245, and the power supply 190 in a form of a battery is located at a lower portion of the second body 205.

Figure 3:
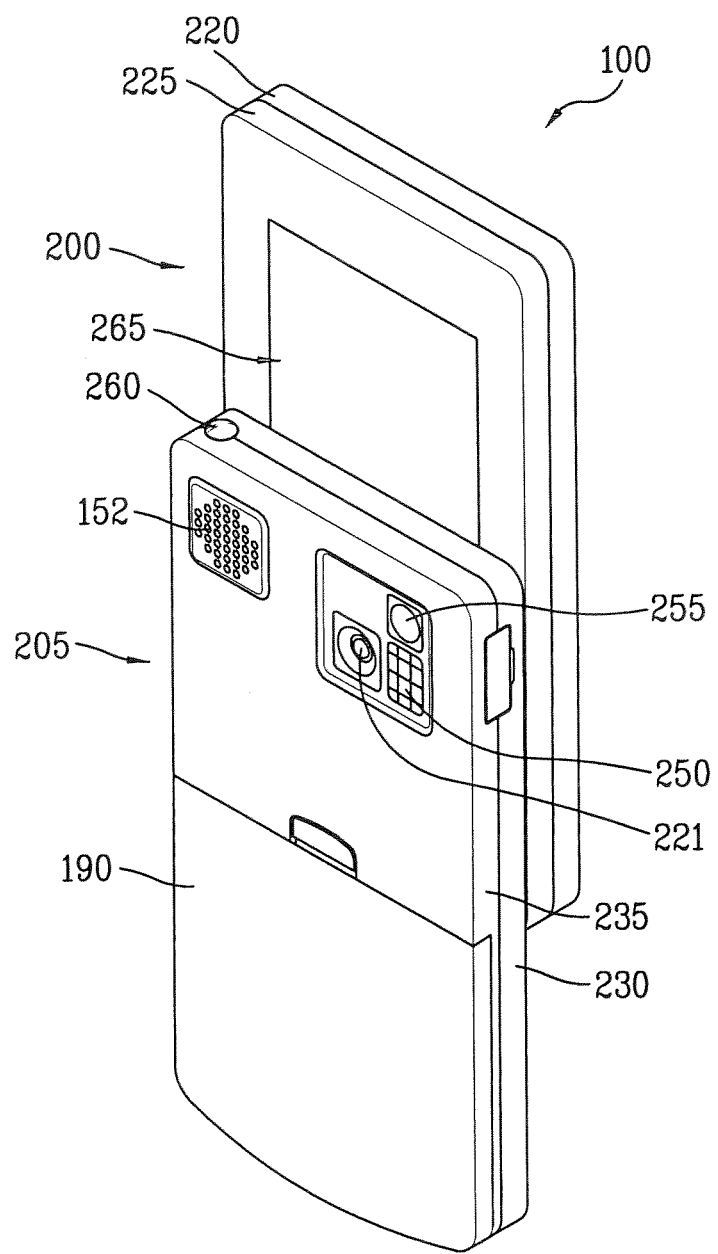
FIG. 3 is a rear view of the mobile terminal shown in FIG. 2.

FIG. 3 is a rear view of the mobile terminal 100 described above with regard to FIG. 2. Referring to FIG. 3, the second body 205 includes a camera 221, and an associated flash 250 and mirror 255. The flash 250 operates in conjunction with the camera 221 of the second body 205. The mirror 255 is useful for assisting a user to position the camera 221 in a self-portrait mode. The camera 221 of the second body 205 faces a direction which is opposite to the direction faced by the camera 121 of the first body 200 shown in FIG. 2. The camera 121 of the first body 200 and the camera 221 of the second body 205 may have the same or different capabilities.

In an embodiment of the present invention, the camera 121 of the first body 200 operates with a relatively lower resolution than the camera 221 of the second body 205. Such arrangement works well during a video conference in which reverse link bandwidth capabilities may be limited. The relatively higher resolution of the camera 221 of the second body 205, as shown in FIG. 3, is useful for obtaining higher quality pictures for later use or for transmitting to others.

The second body 205 also includes an audio output module 152 configured as a speaker and located on an upper side of the second body. The audio output modules 152 of the first and second bodies 200, 205 may cooperate to provide stereo sound. Moreover, either or both of these audio output modules 152 may be configured to operate in a speakerphone mode of the mobile terminal 100.

A broadcast signal receiving antenna 260 is located at an upper end of the second body 205. The broadcast signal receiving antenna 260 functions in cooperation with the broadcast receiving module 111 shown in FIG. 1. The broadcast signal receiving antenna 260 may be fixed or retracted into the second body 205. The rear side of the first body 200 includes a slide module 265, which slidably engages with a corresponding slide module located on the front side of the second body 205.

The illustrated arrangement of the various components of the first and second bodies 200, 205 shown in FIGS. 2 and 3 may be modified as required or desired. In general, some or all of the components of one body may alternatively be implemented on the other body. Further, the location and relative positioning of such components are not critical to many embodiments, and the components may be positioned at locations which differ from those shown in the figures described above.

The mobile terminal 100 shown in FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally or similarly to other types of systems.

Figure 4:
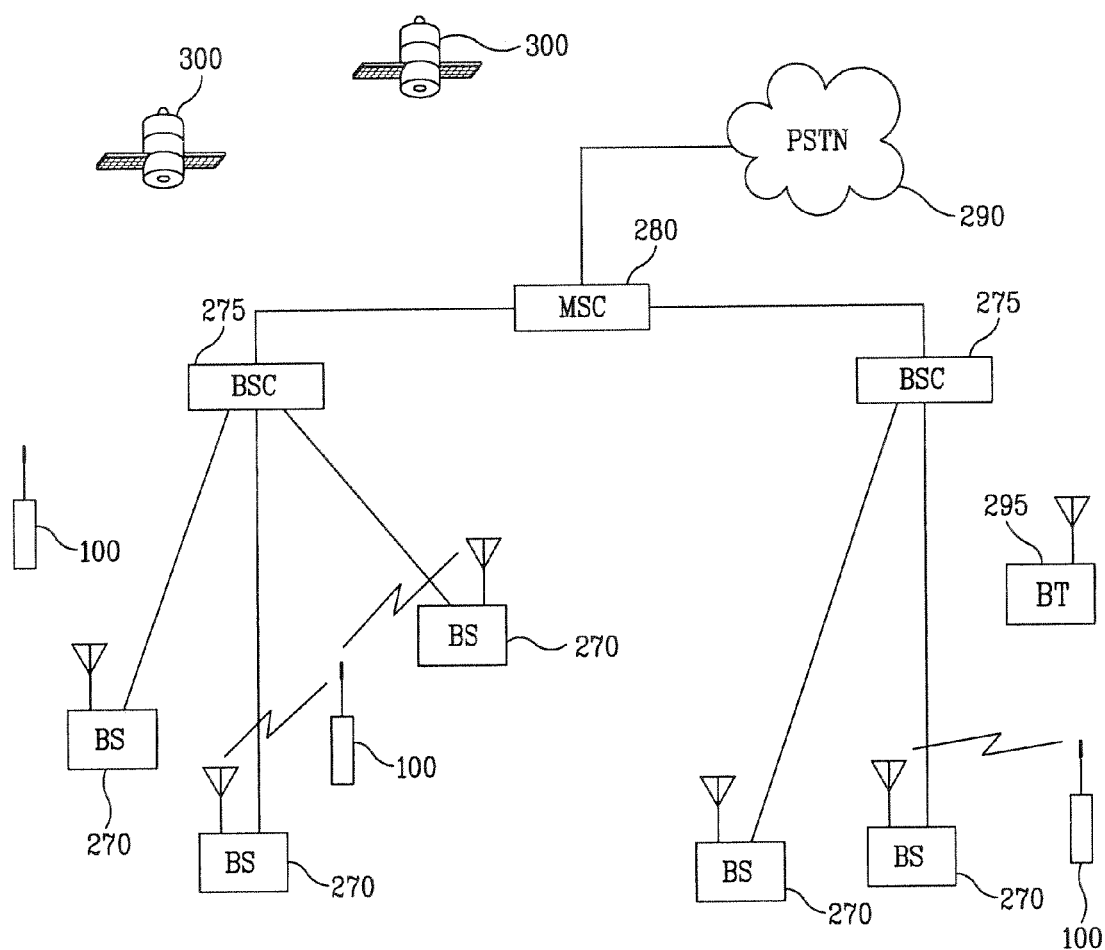
FIG. 4 is a block diagram of a CDMA wireless communication system operable with the mobile terminal of FIGS. 1-3.

Referring to FIG. 4, a CDMA wireless communication system includes a plurality of mobile terminals 100, a plurality of base stations (BS) 270, base station controllers (BSCs) 275, and a mobile switching center (MSC) 280. The MSC 280 is configured to interface with a conventional public switch telephone network (PSTIN) 290. The MSC 280 is also configured to interface with the BSCs 275. The BSCs 275 are coupled to the base stations 270 via backhaul lines. The backhaul lines may be configured according to any of several known interfaces including, E1/T1, ATM, IP, PPP, Frame Relay, HDSL, ADSL, and xDSL. The system may include more than two BSCs 275.

Each base station 270 may include one or more sectors, each sector having an omni-directional antenna or an antenna pointed in a particular direction radially away from the base station. Alternatively, each sector may include two antennas for diversity reception. Each base station 270 may be configured to support a plurality of frequency assignments, with each frequency assignment having a particular spectrum, such as 1.25 MHz or 5 MHz.

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted "cell sites." Alternatively, individual sectors of a given base station 270 may be referred to as cell sites.

A terrestrial digital multimedia broadcasting (DMB) transmitter (BT) 295 broadcasts to the mobile terminals 100 operating within the system. The broadcast receiving module 111 shown in FIG. 1 is typically configured to receive broadcast signals transmitted by the DMB transmitter 295. Similar arrangements may be implemented for other types of broadcast and multicast signaling discussed above.

FIG. 4 further depicts several global positioning system (GPS) satellites 300. Such satellites facilitate locating the position of some or all of the mobile terminals 100. While two GPS satellites 300 are depicted in FIG. 4, useful positioning information may be obtained with greater or fewer satellites depending on the situation. The position-location module 115 shown in FIG. 1 is typically configured to cooperate with the GPS satellites 300 to obtain desired position information. Alternatively, other types of position detection technology, for example, a location technology that may be used in addition to or instead of GPS location technology. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications. Each reverse-link signal received by a given base station 270 is processed within that base station. The resulting data is forwarded to an associated BSC 275. The BSC 275 provides call resource allocation and mobility management functionality including the orchestration of soft handoffs between the base stations 270. The BSCs 275 also route the received data to the MSC 280 which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

Hereinafter, according to an embodiment of the present invention, a method of processing and transmitting information related to a play of data on the mobile terminal 100 at a specific time point of the played data is described. The data, which is played based on the specific time point information, is output according to a duration of a play time assigned to the specific time point. For example, the data may include a moving picture, a music file, such as an MP3 file, and a mobile broadcast. The output data may differ at each point of the play time.

According to an embodiment of the present invention, a mobile terminal 100 is able to share information related to a play of data at a specific time point of the played data with another party or mobile terminal. The information related to the play of data at a specific time point of the played data may include a specific time point of play time, for example, a time point corresponding to 15 seconds from a play start, a specific comment regarding the specific time point of the played data, a control signal enabling the data play from the specific time point, and a URL (uniform resource locator) of a specific website if the data is stored in the specific website.

Figure 5:
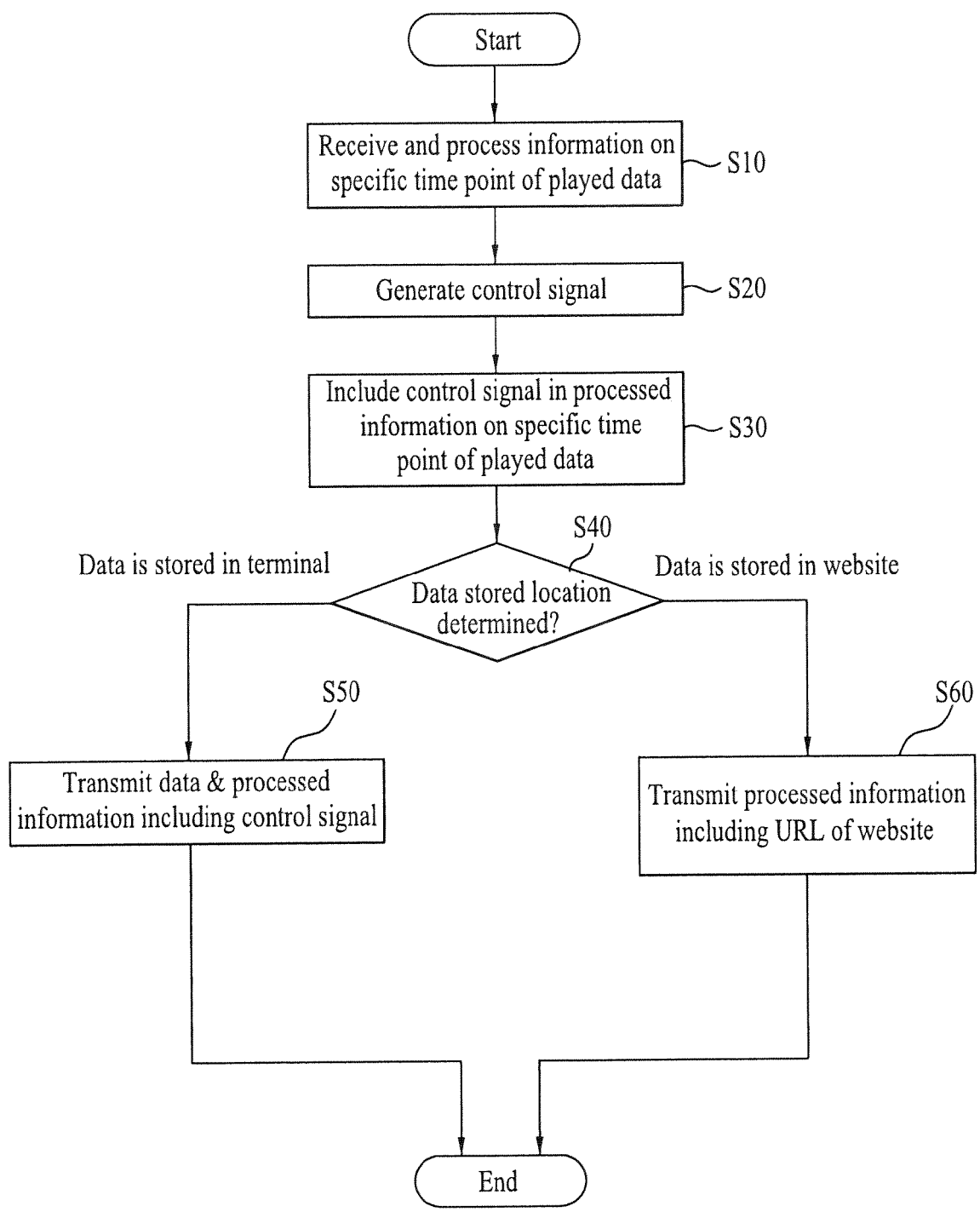
FIG. 5 is a flowchart illustrating transmission of information related to a play of data on the mobile terminal at a specific time point of the played data according to an embodiment of the present invention.

Referring to FIG. 5, a user inputs information at a specific time point of the played data and the mobile terminal 100 receives the input information [S10]. Alternatively, the information is automatically generated by the controller 180 as soon as the specific time point of the played data is selected. One example of the information at the specific time point of the played data which is generated by the user input is a specific comment written about a portion of the data at the specific time point. The specific comment may be composed by the user or selected by the user from a plurality of comments stored in the mobile terminal 100. When the played data is a moving picture file, for example, a comment for a specific scene is written or selected and the comment may be shared with other parties.

In an aspect of the present invention, the information related to a play of data at a specific time point of the played data is stored in the mobile terminal 100 or at a specific website. Subsequently, the controller 180 generates a control signal for enabling the data play from the specific time point of the data [S20]. Using the control signal, the mobile terminal 100 plays the data from the specific time point of the played data. For example, the specific time point may correspond to 15 seconds.

In an aspect of the present invention, a plurality of specific time points of the played data are selected. For example, multiple specific time points of the played data corresponding to 15 seconds, 2 minutes, and 2 minutes and 35 seconds, may be selected. Accordingly, the controller 180 generates a plurality of control signals corresponding respectively to the plurality of the specific time points of the played data.

In an aspect of the present invention, the information related to a play of data at a specific time point of played data includes information on a specific section of the played data. For example, a comment may be written with regard to a section of the played data and the section is positioned between two time points, for example, between 15 seconds and 3 minutes. The written comment may be included in the information related to the play of data.

The controller 180 includes the generated control signal in the information at the specific time point of the played data [S30]. The controller 180 may directly control the generated control signal such that the generated control signal is included in the information at the specific time point of the played data. If the data exists at a specific website, the controller 180 may transmit a specific control signal to the website such that a process of including a control signal, which is generated from the website, in the information at the specific time point of the played data is executed at the website.

In an aspect of the present invention, the information related to a play of data at a specific time point of the played data varies depending on whether the data is stored in the mobile terminal 100 or at a specific website. For example, when the data is stored in the mobile terminal 100, the controller 180 transmits the data to a communicating party along with the information related to the play of the data at the specific time point of the played data [S40, S50]. The transmission of the data and the information related to the play of the data at the specific time point of the played data may be performed by at least one of e-mail, MMS (multimedia message service), SMS (short message service), IM (instant message), and short-range communication, for example.

In another example, when the data is stored in the website, the controller 180 includes a URL of the website in the information related to the play of the data at the specific time point of the played data and transmits the information including the URL of the website to a communicating party [S40, S60]. In this case, the URL of the website may include a link for the URL of the website such that the web site can be readily accessed during the play of the data.

Figure 6:
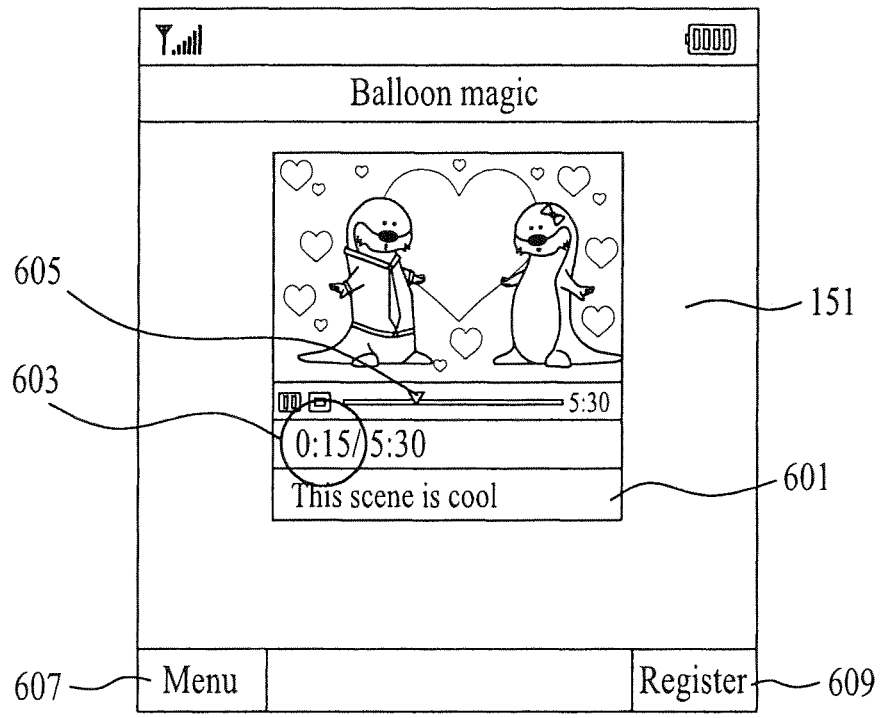
FIGS. 6 to 9 are screen views on a display of a mobile terminal according to an embodiment of the present invention that illustrate transmission of information related to a play of data on the mobile terminal at a specific time point of the played data.

Referring to FIG. 6, the mobile terminal 100 plays data stored in the memory 160. For example, a moving picture is played on the display 151 of the mobile terminal 100 when the stored data is selected to be played. While the moving picture is being played, a user writes a comment for a specific time point of the played data. In FIG. 6, a scene is displayed at a time point of the played data corresponding to 15 seconds and the user enters a comment, "This scene is cool" for the specific time point of the played data. The time point of the played data corresponding to 15 seconds is specified in response to the user's selection.

In an aspect of the present invention, time information 603 on the specific time point of the played data, as specified by the user, is displayed above a comment input window 601. The time information 603 may be displayed when the comment input window 601 for inputting the comment is selected at the specific time point of the played data or when a specific time point on a progress bar 605 indicating the progress of the played data is selected. The time information 603 on the specific time point of the played data may also be displayed when a specific key signal for selecting the specific time point is input. The controller 180 may display the time information 603 on the specific time point of the played data in response to an entry of a 'Menu' item 607.

The written comment is displayed on the input window 601. After the comment is written, the user registers the comment as information related to a play of the data at the specific time point of the played data by selecting a 'Register' key 609 displayed at a lower portion on the screen of the display 151. The registered information is stored in the memory 160. The controller 180 may transmit the information related to the play of the data at the specific time point of the played data to a communicating party. The controller 180 may transmit the information related to the play of the data at the specific time point of the played data, which includes the written comment, to the communicating party as soon as the information is stored. Alternatively, the controller 180 may transmit the information without storing.

The controller 180 generates a control signal for enabling the data play from the specific time point of the played data and includes the generated control signal in the information related to the play of the data at the specific time point of the played data. Then, the controller 180 transmits the data with the control signal and the information related to the play of the data.

Figure 7:
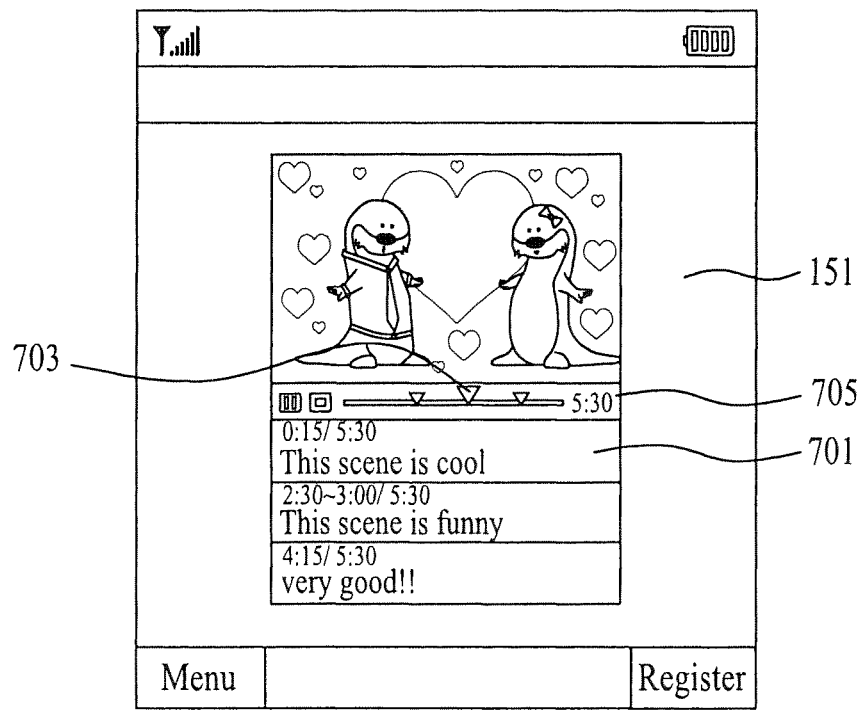

Referring to FIG. 7, comments for a plurality of specific time points of played data are written in a comment input window 701. Information related to a play of the data at a specific time point of the played data includes information on a specific section of the played data. For example, a user writes a comment, "This scene is funny" with regard to a section of the played data which is positioned between 2 minutes 30 seconds and 3 minutes. When there are a plurality of specific time points or sections in the played data, the controller 180 generates a plurality of control signals corresponding respectively to the plurality of the specific time points or sections of the played data.

The controller 180 includes the generated control signals in the information related to the play of the data at the specific time point of the played data. When transmitting the information, the controller 180 also transmits the data with the control signals.

In order to display time information on each of the plurality of specific time points of the played data, the controller 180 displays a plurality of indicators 703 on a progress bar 705 corresponding to the plurality of specific time points of the played data. The indicators may be distinguished from each other by distinct colors, shapes, or sizes, for example.

Figure 8:
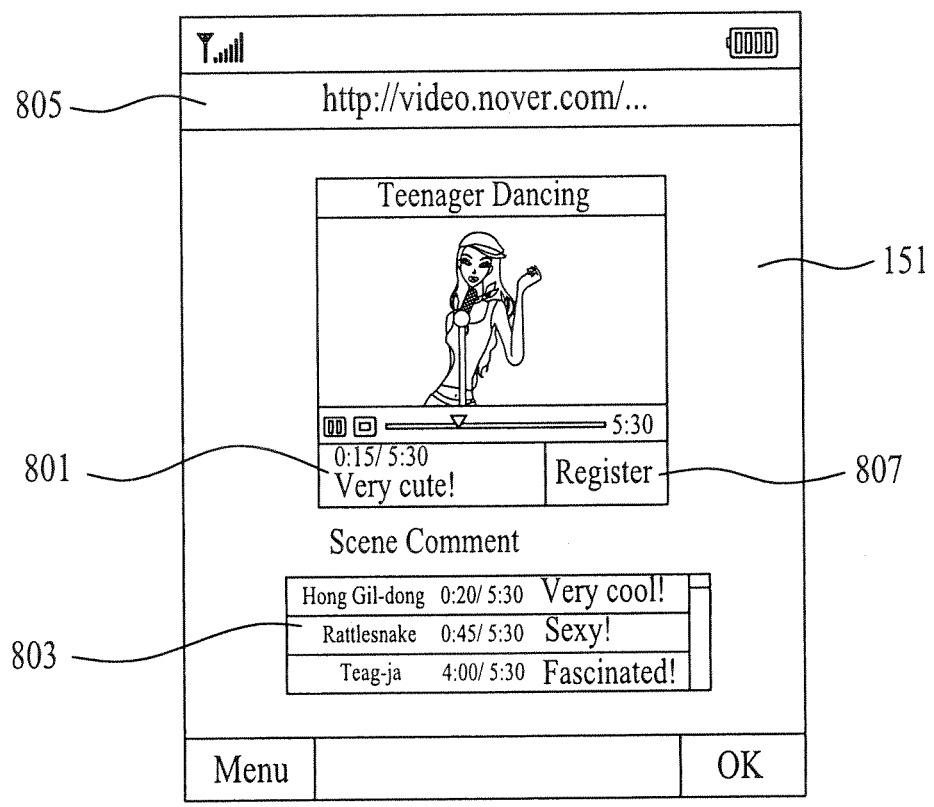

Referring to FIG. 8, a URL of a website 805 in which the data is stored is displayed at an upper portion of a screen on the display 151. An image of a played moving picture stored at a specific website is displayed on the screen. Similar to the above described embodiment of the present invention, a user writes a comment for a specific time point of the played moving picture while viewing the moving picture. For example, a user writes a comment at a specific time point of the played moving picture, wherein the specific time point corresponds to 15 seconds. The written comment is displayed on an input window 801. After the comment is written, the user selects a 'Register' menu 807 positioned next to the input window 801 to register the written comment as information related to the play of the moving picture at the specific time point for the data corresponding to the moving picture.

The registered information may be stored or registered at the website. Once the written comment is registered, the controller 180 may display a popup window, prompting whether to transmit the registered comment. For example, the popup window displays 'transmit the registered content?' Further, a check box for selecting a scene comment may be displayed next to the displayed scene comment. Once the check box is selected, the controller 180 sends a message including the selected scene comment.

Through the displayed image, the user may recognize a comment written by a visitor of the website with regard to the specific time point of the played data. The comment 803 written by the website visitor is displayed below the 'Scene Comment' item on the display 151. The controller 180 transmits the comment written by the user or the website visitor with regard to the specific time point of the played data. The controller 180 may also store the information related to the play of the data at the specific point of the played data, which includes the written comment, in the memory 160 and transmit the information to a communicating party. Alternatively, the controller 180 may transmit the information without storing in the memory 160.

The controller 180 generates a control signal for enabling data play from the specific time point and transmits the data with the control signal and the information related to the play of the data. The controller 180 either directly controls the generated control signal such that the control signal is included in the information related to the play of the data or transmits the specific control signal to the website such that the control signal is generated from the website and included in the information at the website.

Figure 9:
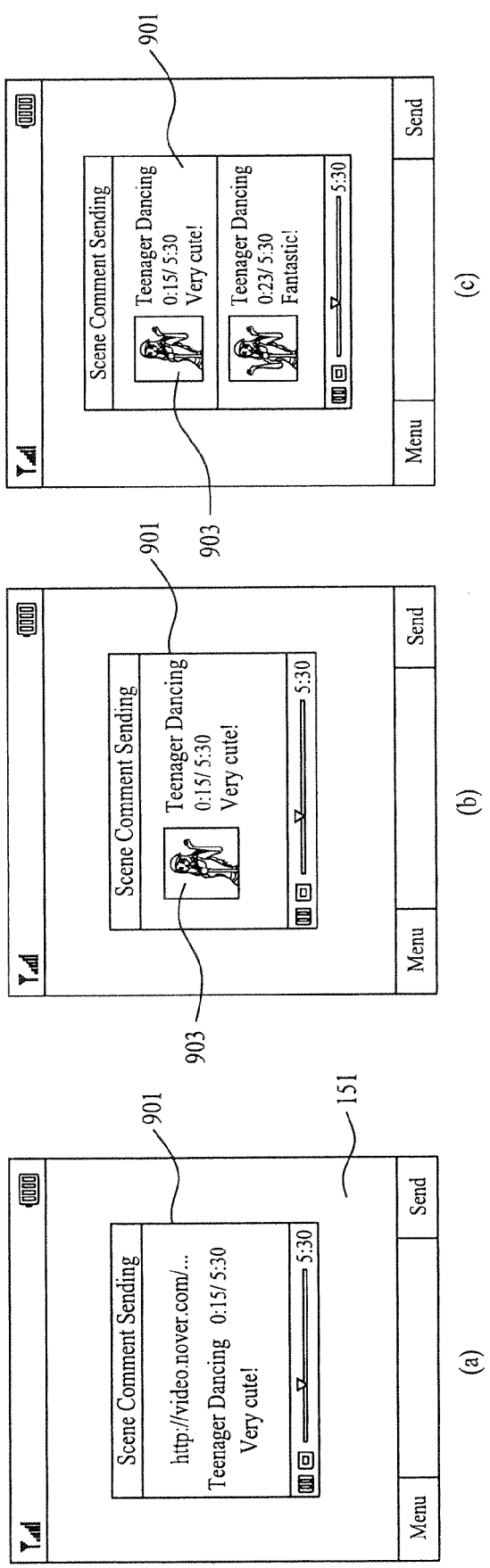

According to one embodiment of the present invention, the information related to a play of data at a specific time point of the played data, which is stored in the mobile terminal 100 or the website, is transmitted in a message format, as shown in FIG. 9. Referring to FIG. 9(*a*), the information related to the play of the data stored in the website is generated in a message format and then transmitted. The message includes a URL of the website, a title of the data (for example, 'Teenager Dancing' as shown in FIG. 9(*a*)), a scene comment, and the specific time point where the scene comment is available. For example, the message is displayed as a popup window 901 such that a user is able to confirm the message. The message is generated by interoperating with the website such that when information related to the play of the data at the specific time point of the played data is input at the website, the controller 180 automatically generates the message including the input information. Further, a specific statement may be further added to the message in response to the user's selection.

The controller 180 controls the data stored in the website such that the data are transmitted with the message. For example, the controller 180 downloads the data stored in the website and then transmits the data. Alternatively, the controller 180 directly transmits the data stored at the website to a party on the website.

Referring to FIG. 9(*b*), information related to a play of data at a specific time point of the played data is generated in a message format and then transmitted. The example shown in FIG. 9(*b*) is applicable to transmission of information stored in a mobile terminal or a website. A popup window 901 for confirming a message to be transmitted includes data displayed as a thumbnail image 903, a title of the data (for example, 'Teenager Dancing' in FIG. 9(*b*)), a scene comment, and a specific time point of the played data with the scene comment. If the thumbnail image 903 is the data stored in the website, the message can be generated by interacting with the website. For example, if the information related to the play of the data at the specific time point of the played data is input at the website, the controller 180 automatically generates a message including the input information. Further, a specific statement may also be added to the message in response to a user's selection.

Referring to FIG. 9(c), information related to a play of data at a plurality of specific time points of the played data is transmitted in a message format. The method of transmitting the message as shown in FIG. 9(b) is also applicable to the example shown in FIG. 9(c).

The thumbnail 903 representing the data may display an image matching the corresponding scene. When the thumbnail 903 is selected, for example, by a touch on a touchscreen, the controller 180 displays several captured images in a slide form.

The mobile terminal 100 according to one embodiment of the present invention receives the information related to the play of the data at the specific time point of the played data transmitted according to the method described above with FIGS. 5 to 9, and plays the received data. A method of receiving the information and playing the data is described below.

Figure 10:
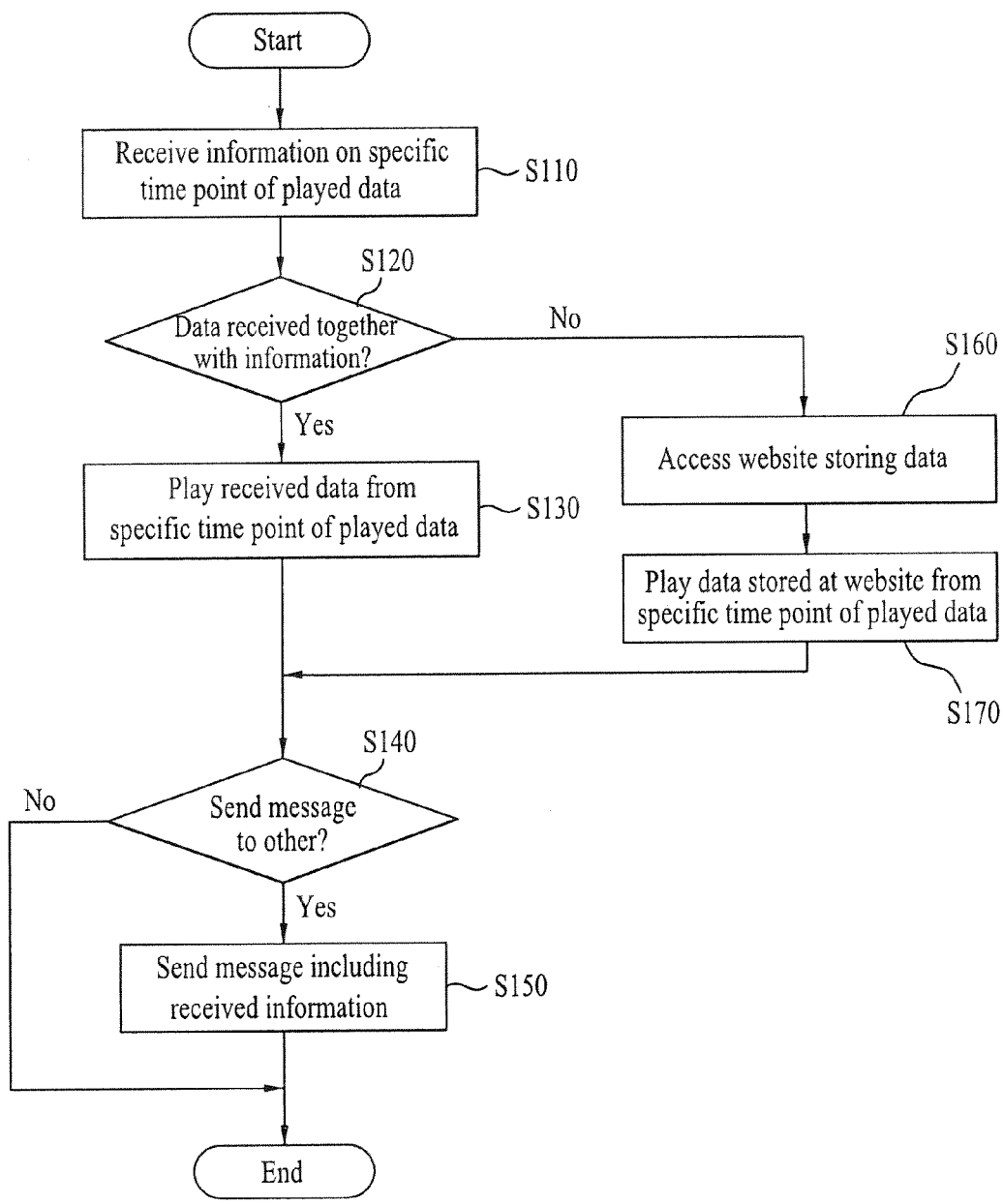
FIG. 10 is a flowchart illustrating playing data from a specific time point of the data in a mobile terminal according to an embodiment of the present invention.

Referring to FIG. 10, the mobile terminal 100 receives the information related to the play of the data at the specific time point of the played data via the wireless communication unit 110 [S110]. Depending on whether the information is received with the data or not, a method of playing the data may vary.

If the data is received with the information [S120 Yes], the controller 180 plays the received data from the specific time point using the received information [S130]. If the information is related to a play of data at a plurality of specific time points of the played data, the controller 180 plays the data from a selected one of the plurality of specific time points. If the information related to the play of the data includes information regarding a specific section of the data, the controller 180 plays the specific section. Of course, the controller 180 may play the received data from the beginning of the data.

On the other hand, if the data is not received with the information related to the play of the data at the specific time point of the played data [S120 No], the controller 180 accesses a specific website in which the data is stored using URL information included in the received information [S160]. Subsequently, the controller 180 plays the data stored at the specific website from the specific time point using the received information [S170]. The information stored in the specific website includes URL information on the specific website and time information corresponding to the specific time point of the played data. In one aspect of the present invention, the controller 180 downloads the data from the specific website and then plays the downloaded data. Alternatively, the controller 180 receives streaming data from the website and plays the streaming data.

According to one embodiment of the present invention, if a user wishes to forward the received message to another user, the mobile terminal 100 generates the received information in a message format and then transmits the message to another mobile terminal. [S140, S150]. The message including the information may be sent to a party who has transmitted the information or a third party. The data and/or the information related to the play of the data at the specific time point of the played data may be received by using at least one of e-mail, MMS (multimedia message service), SMS (short message service), IM (instant message), and short-range communication, for example.

Figure 11:
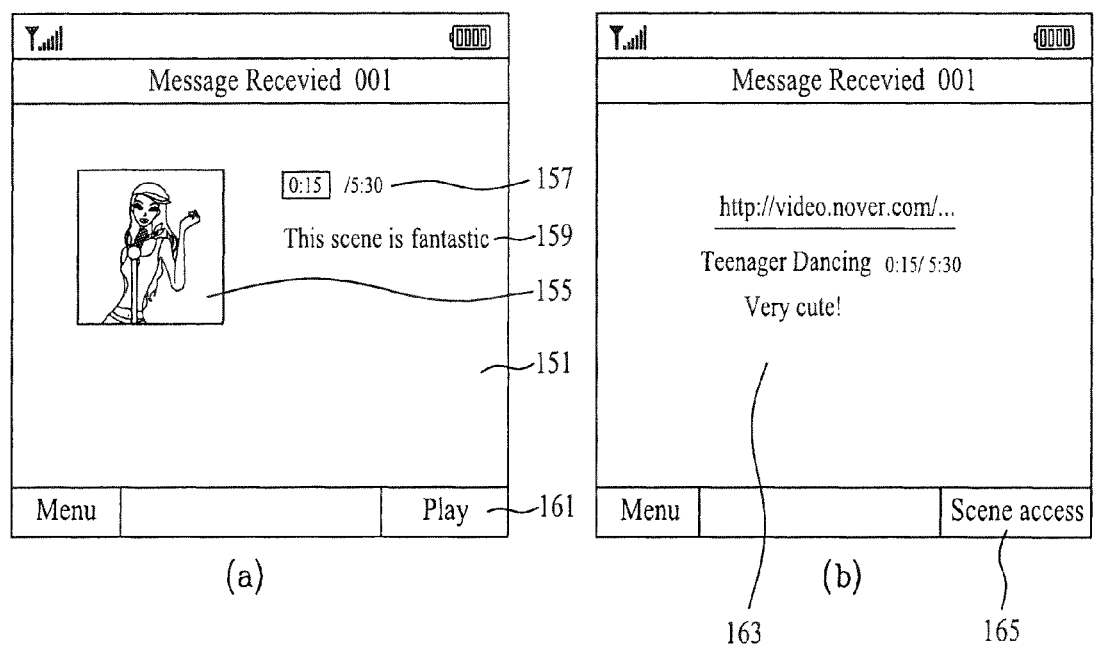
FIGS. 11 to 15 are screen views on a display of a mobile terminal according to an embodiment of the present invention that illustrate data play from one of a plurality of specific time points of the data in the mobile terminal.

Referring to FIG. 11(a), thumbnail type data 111, time information 157 on the specific time point of the played data, and a comment 159 relevant to the specific time point of the played data are included in a message. If a user selects the 'Play' menu 161 displayed at a lower portion of the screen, the controller 180 plays the received data from the specific time point. The received information includes a control signal for enabling the data play.

Referring to FIG. 11(b), a message 163 including the information related to the play of the data and a related specific website is received. For example, the message includes a URL of the specific website, a title of the data such as 'Teenager Dancing,' time information regarding the played data, and a comment relevant to the specific time point of the played data. If a user selects a 'Scene access' menu 165 displayed at a lower portion of the screen, the controller 180 accesses the specific website and plays the data stored at the website from the specific time point as indicated in the message 163.

A control signal for enabling the data play from the specific time point of the played data may be included in the received information. Alternatively, the control signal may be received together with the information. In one aspect of the present invention, the controller 180 downloads the data from the specific website and then plays the downloaded data. Alternatively, the controller 180 receives streaming data from the website and plays the streaming data. If the displayed URL is linked to the website, the controller 180 is able to access the website in response to selection of the displayed URL.

Figure 12:
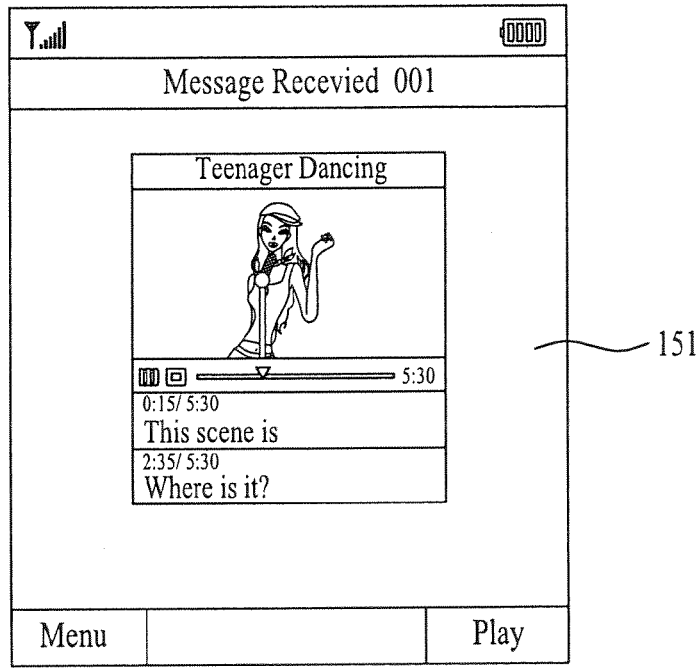

Referring to FIG. 12, a plurality of comments with regard to a plurality of the specific time points in the played data are displayed on the screen. The controller 180 arranges the comments in the order of specific time points of the played data or time points when the comments were entered. When one of the plurality of the specific time points of the played data is selected, the controller 180 plays the data from the selected specific time point.

Figure 13:
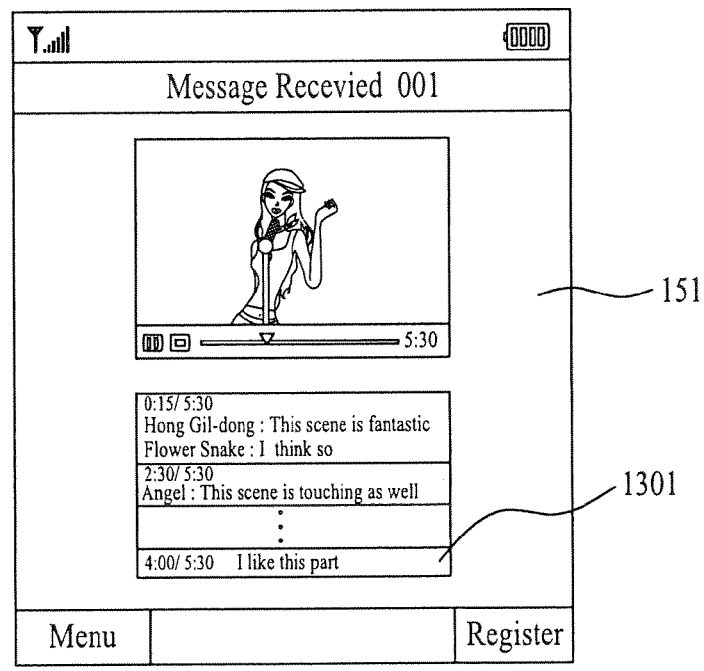

According to one embodiment of the present invention, the mobile terminal 100 adds information related to the play of the data at another specific time point of the played data to the received information and then transmits the added information. Referring to FIG. 13, a comment written by an ID 'Hong Gil-dong' is displayed at a time point corresponding to a play time of 15 seconds and a comment written by an ID 'Angel' is displayed at a time point corresponding to a play time of 2 minutes and 30 seconds. Subsequently, a user adds his or her own comment, 'I like this part' with regard to a specific point of the played data, for example at 4 minutes, on a comment input window 1301. Accordingly, the controller 180 reconfigures the information to include the added comment and transmits the reconfigured information to a communicating party. Alternatively, the additional comment may be added to a specific time point with a previous comment.

According to one embodiment of the present invention, the received information may be edited or deleted. For example, when information related to a play of data at a plurality of specific time points of the played data is received, the information regarding one or more of the plurality of specific time points of the played data may be deleted while the information regarding the rest of the specific time points of the played data is stored. Further, a beginning and/or an ending point of the specific time points in the received information may be adjusted. Furthermore, the information with regard to a specific time point of the played data may be added as described above with FIG. 13.

Figure 14:
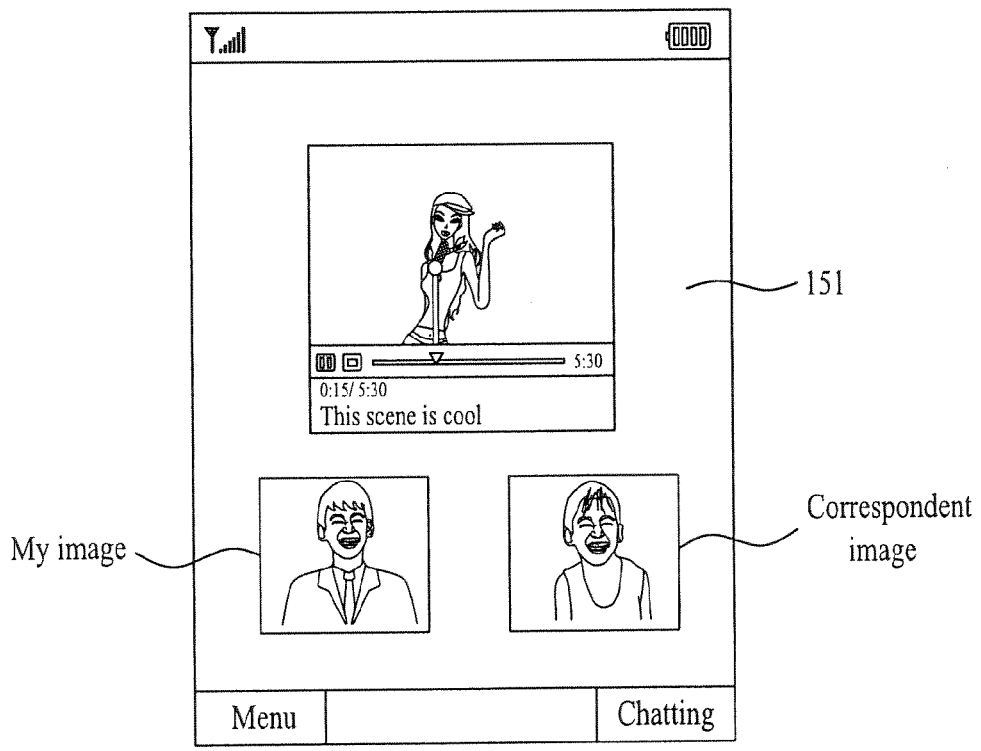

According to one embodiment of the present invention, the mobile terminal 100 receives information related to a play of data at a specific time point of the played data from a third party during video communication and then shares the received information with a party engaged in the video communication by transmitting the received information to the party engaged in the video communication, as shown in FIG. 14. A terminal of the party engaged in the video communication or the mobile terminal 100 plays the data from the specific time point of the played data using the shared information.

Figure 15:
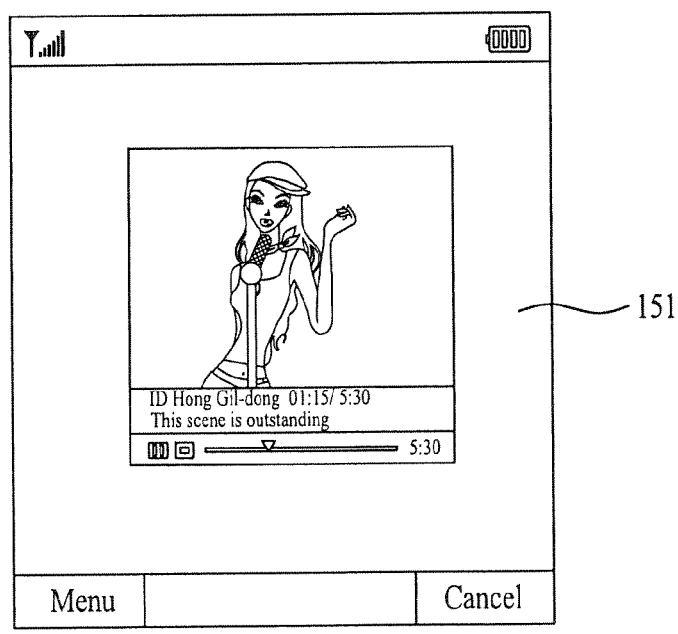

According to one embodiment of the present invention, when playing the data, the controller 180 displays a comment relevant to a specific time point of the played data on the screen on which the played data is being displayed, as shown in FIG. 15, for example. When information related to a play of data at a plurality of specific time points of the played data is received, if the corresponding data is played, each of the comments corresponding to the plurality of specific time points of the played data is displayed as a caption at a lower portion of a screen, on which the played data is being displayed.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like, for example, and also include carrier-wave type implementations, such as transmission via Internet. And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a camera configured to obtain first video data;
a display configured to display video data;
a memory for storing data;
a controller configured to:
process information for enabling playing second video data at one or more specific time points of the second video data, wherein the second video data is stored in the memory or received from a source external to the mobile terminal;
recognize the one or more specific time points;
generate a control signal for enabling the second video data to play from the one or more specific time points;
control playing the first video data;
control playing the second video data according to the control signal and the processed information; and
control the display to simultaneously display, in a video call mode, the first video data and the second video data; and
a wireless communication unit configured to transmit, under control of the controller, the control signal and the processed information to a communication device with which the mobile terminal is communicating.

2. The mobile terminal of claim 1,
wherein the controller is further configured to control the wireless communication unit to transmit the second video data with the control signal and the processed information to the communication device with which the mobile terminal is communicating.

3. The mobile terminal of claim 2, wherein the wireless communication unit is further configured to transmit the control signal, the processed information and the second video data to the communication device with which the mobile terminal is communicating using E-mail, a multimedia message service (MMS), a short message service (SMS), an instant message (IM) service, or short-range communication.

4. The mobile terminal of claim 1, wherein:
the one or more specific time points of the second video data is a plurality of specific time points; and
the control signal enables playing of the second video data from one of the plurality of specific time points of the second video data.

5. The mobile terminal of claim 1, wherein:
the information relates to a specific time period of the second video data; and
the control signal enables playing of the second video data according to the specific time period.

6. The mobile terminal of claim 1, wherein the information comprises a user comment related to the second video data or time information related to the one or more specific time points.

7. The mobile terminal of claim 6, further comprising:
an input unit configured to receive the user comment from a user.

8. The mobile terminal of claim 6,
wherein the user comment is selected from a plurality of user comments stored in the memory.

9. The mobile terminal of claim 1, wherein:
the second video data is stored on a website; and
the controller is further configured to control the wireless communication unit to transmit the control signal and the processed information with peripheral information related to the second video data stored on the website to the communication device with which the mobile terminal is communicating.

10. The mobile terminal of claim 9, wherein the peripheral information comprises uniform resource locator (URL) information of the website.

11. The mobile terminal of claim 9, wherein the control signal allows playing of the second video data from a specific time point of the second video data stored on the website.

12. A method for transmitting information in a mobile terminal, the method comprising:
obtaining first video data via a camera of the mobile terminal;
processing, via a controller of the mobile terminal, information for enabling playing second video data at a specific time point of the second video data, wherein the second video data is stored in a memory of the mobile terminal or received from a source external to the mobile terminal;
recognizing, via the controller, the specific time point;
generating, via the controller, a control signal for enabling playing of the second video data from the specific time point;
controlling, via the controller, a wireless communication unit of the mobile terminal to transmit the first video data, the control signal and the processed information to a communication device with which the mobile terminal is communicating;
controlling, via the controller, playing of the second video data according to the control signal and the processed information; and
controlling, via the controller, a display of the mobile terminal to simultaneously display, in a video call, the first video data and the second video data.

* * * * *